Patented Mar. 7, 1939

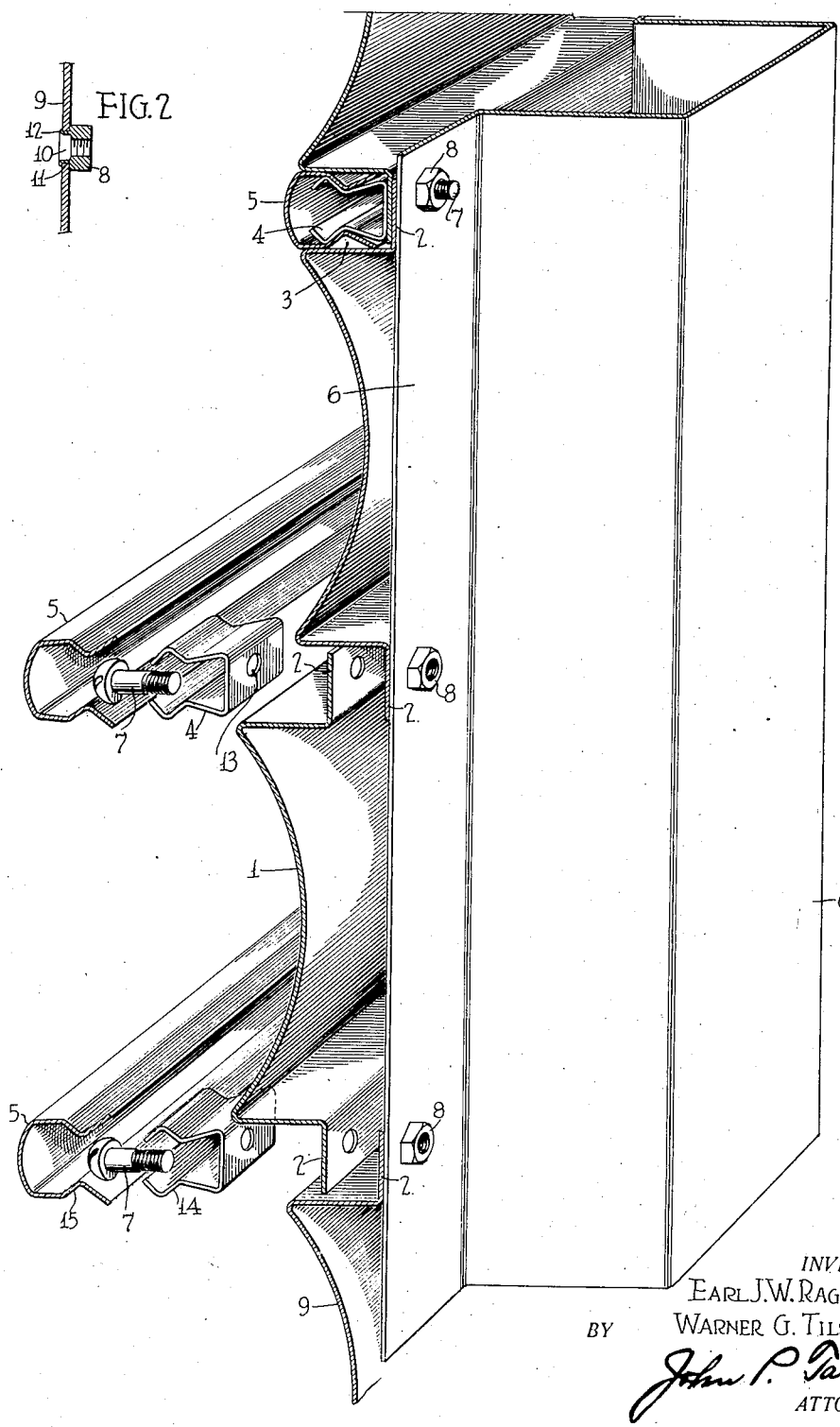

2,150,130

UNITED STATES PATENT OFFICE 2,150,130

REMOVABLE PANELING

Earl J. W. Ragsdale, Norristown, and Warner G. Tilsher, Philadelphia, Pa., assignors to Edward G. Budd Manufacturing Co., Philadelphia, Pa., a corporation of Pennsylvania Application September 17, 1935, Serial No. 40,874

6 Claims. (Cl. 189—86)

The present invention relates to sheet metal paneling or sheathing and has particular reference to paneling for light weight sheet metal structures such as light, high speed rail cars, busses or the like.

Heretofore in the construction of light weight rail car bodies, the side sheathing or paneling was built up of panel strips running lengthwise of the car with turned in flanges along their edges, the panel strips being arranged edge to edge with the inturned flanges overlapping and secured together by spot welding and secured to the car framing through angle brackets spot welded to convenient posts or other frame elements of the car and to the inturned flanges of the paneling.

In the old construction, replacement of any portion of the side paneling after completion of the car body, required not only the removal of a portion of the interior trim of the car body, but the use of special welding tools and apparatus and the services of workmen especially skilled in the type of work and the handling of the particular kind of material involved in the original construction of the car.

The main object of the present invention, therefore, is to provide a panel structure in which the panel sections are interchangeable and readily removable after replacement of damaged panels, and which removal and replacement may be effected wholly from the outside without disturbing the inside trim such as inner paneling, upholstering, etc., and without the use of special tools or machinery or the employment of specially skilled workmen.

This main object of the invention is attained by the provision of sheet metal panel sections or strips of which the opposite marginal edges are offset rearwardly of the face of the panel so that when the panels are placed edge to edge the offset marginal edges will form a recess or groove between two adjacent panel strips into which groove suitable fasteners, such as bolts, may be placed for securing the offset flanges to convenient upright posts or other framing elements of the car body to removably secure the sheathing to the car body, a suitable ornamental and protecting cover strip being provided for the recess between the adjacent panel strips, the cover strips being held in place by spring clips within the groove and preferably secured in place therein by the same fasteners as are used to secure the paneling to the car frame.

Various other objects and advantages of the invention will be apparent from a perusal of the following specification and the drawing accompanying the same.

In the drawing,

Figure 1 is a fragmentary perspective partly in section and partly exploded showing a portion of a paneling structure embodying the invention.

Figure 2 is a fragmentary sectional view showing the connection between a nut and the framing.

Referring to the drawing in detail, the sheathing is built up of a plurality of panel sections 1 of sheet metal in the form of concave strips, each having opposite marginal edge portions 2 offset rearwardly of the face of the panel. These panel sections are arranged edge to edge with their offset marginal edges 2 overlapping and forming recesses or grooves 3 between the panel sections which house spring clips 4 for holding in place the cover strips 5, for filling in and covering the recesses or grooves between the panel sections. The panel sections are secured by their overlapping, offset marginal portions 2 to convenient framing elements of the structure to be sheathed such as the upright element 6, by means of the bolts 7 and nuts 8. In the present instance the nuts 8 are permanently secured to the flange 9 of the upright 6 as shown in Figure 2. This fastening of the nut to the sheet metal flange of the upright is accomplished through the provision on the nut of an extended throat portion 10 of reduced outside diameter which is passed through an opening 11 in the sheet metal flange 9 and clinched or swaged outwardly on the opposite side as indicated at 12 in Figure 2.

The nut 8 may be otherwise fastened to the framing as by spot welding or by suitable mechanical engagement between the framing and the nut. This use of the nut secured to the framing is of special utility where the framing is of high tensile stainless steel, which material is difficult to tap thereby making it inexpedient to provide threaded openings in the framing. Where the framing is of metal or other material readily tapped, or of wood, other suitable fastening means may be used.

The bolts 7 serve also to secure the spring clips 4 in place in the bottom of the grooves 3, the bolts 7 passing through apertures 13 in the bottom of the clips 4 and suitable apertures in the offset marginal portions 2 of the panel sections into threaded engagement with the nuts 8. The panel sections are thus secured to the framing elements such as 9 at suitable intervals along their length, each such connection preferably including a spring clip 4, although in cases where the points of connection are frequent, it may be desirable to have the spring clips less in number than the number of points of connection of the sheathing with the framing. With the sheathing thus assembled on the frame, the spring clips 4 are housed well within the grooves formed between adjacent panels.

The cover strips 5 are of channel section with slightly outsprung side walls so proportioned as to fit into the grooves between the panels with the bottom wall of the channel section of the cover strip forming a cover for the groove. The sides of the spring clips are also slightly outsprung and are provided with re-entrant portions 14 complementary to re-entrant portions 15 in the side walls of the cover strips so that when the cover strip is forced into place in the groove the re-entrant portions will engage to lock the cover strip in the position shown at the top of Figure 1. With the complementary re-entrant portions of the spring clips and cover strips thus interlocked under spring tension, the cover strips 5 are held securely in position, their outer surfaces forming a continuation of the outer surfaces of the panel sections.

It will be clear from the above, that with the present construction, the nuts 8 being already secured in place on convenient portions of the framing, the sheathing may be applied to the framing either before or after the application of suitable interior trim to the inner side of the framing, such as paneling or upholstering in the case of a rail car or a bus body. Also, and most important, of the advantages of this structure is that after completion, and during use, should it become necessary to replace a portion of the side paneling, removal and replacement may be effected wholly from the outside without disturbing the inside trim and without the use of special tools or machinery, or especially skilled labor.

To remove the panel it is only necessary to pry off the two cover strips 5 at the offset edges of the panel to be removed giving access to the fastening bolts 7 which may then be unfastened, enabling the panel and its spring clips to be removed. The new panel may then be put in place of the old panel and secured in position with the spring clips and cover strips placed as before. Obviously, new cover strips 5 may also be substituted for the old if necessary.

While a specific embodiment of the invention is herein shown and described for the sake of disclosure, it is to be understood that the invention is not limited to such specific embodiment, but contemplates all such variants and modifications thereof as fall fairly within the scope of the appended claims.

What is claimed is:

1. A sheet metal panel structure for sheathing a vehicle body comprising interchangeable sheet metal bowed panel sections having opposite marginal edges offset rearwardly of the face of the panel and substantially the full depth thereof, said sections having relatively fixed marginal edges forming a relatively deep groove, fastening means removably securing said panels to a base structure by said offset marginal edges, spring clips secured within the grooves, said spring clips being of U-shape in cross section with the sides thereof being reversely curved, and cover-strips secured in covering relation to the grooves by the sides of said spring clips, said cover strips being curved in a complementary manner between said bowed panel sections and extending into said grooves between said spring clips and the juxtaposed marginal edges of the panel sections.

2. An interchangeable panel structure comprising sheet metal panel sections each having opposite marginal edges offset rearwardly of the face of the panel, said panels being arranged with adjacent offset margins overlapping, fastening means removably securing said panels to a base structure through the overlapping offset margins, a channel section spring clip secured in the groove formed by the overlapping offset margins having outsprung sides, and an inwardly facing channel section finishing cover-strip fitted in the groove with its sides sprung in between the sides of the groove and the outsprung sides of said spring clip.

3. An interchangeable panel structure comprising sheet metal panel sections bowed in cross section between opposite parallel edges, and fastening means removably securing said panels to fixed points on a base structure along their said parallel edges, spring clips secured at the said parallel edges of the panels by the same said fastening means, and covering-strips secured to said spring clips and arranged to cover the adjacent edges of a pair of juxtaposed panels, said spring clips and cover strips each being of substantially U-shape in cross section with the walls thereof having reverse curve portions, the curve portions of the cover strip walls being complementary to the curved portions of the spring clip walls and resiliently anchored thereto in covered position.

4. An interchangeable panel structure comprising sheet metal panel sections each having opposite marginal edges offset rearwardly and laterally of the face of the panel and with adjacent strips forming a relatively narrow and deep groove therebetween, the sides of which are substantially parallel, spring clips in said grooves having outwardly extending sides, the outer free parts of which are resiliently urged toward the adjacent groove sides, the clip sides forming a relatively restricted neck inwardly of their free ends and free to move with respect to the groove sides, and cover strips for said grooves each of substantially U-shape in cross section with its sides engaging both the groove sides and the clip sides and having portions larger than the neck so that the free parts of the clip must be deflected for attachment or removal of the cover strip.

5. A sheet metal panel structure for sheathing a vehicle body comprising interchangeable sheet metal panel sections having opposite marginal edges offset rearwardly of the face of the panel, said edges forming relatively fixed sides of a relatively deep groove between adjacent panel sections, spring clips secured within the groove, said spring clips having outwardly projecting portions adjacent the relatively fixed sides of the groove and being reversely curved, and cover strips for said grooves, said cover strips being of generally U-shape in cross section, the sides of which are reversely curved in a manner complementary to the curvature of said spring clips whereby said cover strip is flexibly held to said spring clip.

6. An interchangeable panel structure comprising sheet metal panel sections each having marginal edges offset inwardly of the outer face of the panel and forming with adjacent panel sections relatively deep narrow outwardly presenting channels, the inwardly offset marginal edges being laterally offset, a base structure, the lateral offsets overlapping the base structure, means including channel section spring clips securing said lateral offsets to the base structure, said spring clips having long spring arms approaching the depth of said channels, and a narrow U-shaped cover strip having side walls engaged by said spring clips to flexibly hold said cover strip in place.

EARL J. W. RAGSDALE.
WARNER G. TILSHER.